US005487159A

United States Patent [19]
Byers et al.

[11] Patent Number: 5,487,159
[45] Date of Patent: Jan. 23, 1996

[54] SYSTEM FOR PROCESSING SHIFT, MASK, AND MERGE OPERATIONS IN ONE INSTRUCTION

[75] Inventors: Larry L. Byers, Apple Valley; Joseba M. De Subijana, Minneapolis; Wayne A. Michaelson, Circle Pines, all of Minn.

[73] Assignee: Unisys Corporation, Blue Bell, Pa.

[21] Appl. No.: 172,526

[22] Filed: Dec. 23, 1993

[51] Int. Cl.$^6$ .............................. G06F 9/305; G06F 9/315
[52] U.S. Cl. ..................................... 395/375; 364/DIG. 1
[58] Field of Search ............................................... 395/375

[56] References Cited

U.S. PATENT DOCUMENTS

| | | | |
|---|---|---|---|
| 3,906,459 | 9/1975 | Desmonds | 340/172.5 |
| 3,982,229 | 9/1976 | Rouse | 340/172.5 |
| 4,139,899 | 2/1979 | Tulpule | 364/900 |
| 4,467,444 | 8/1984 | Harmon, Jr. | 364/900 |
| 4,520,439 | 5/1985 | Liepa | 364/200 |
| 4,556,978 | 12/1985 | Kregness | 371/49 |
| 4,569,016 | 2/1986 | Hao | 364/200 |
| 4,595,911 | 6/1986 | Kregness | 340/347 |
| 4,760,517 | 7/1988 | Miller | 364/200 |
| 4,903,228 | 2/1990 | Gregoire | 364/900 |
| 5,059,942 | 10/1991 | Burrows | 340/146.2 |
| 5,129,066 | 7/1992 | Schmookler | 395/375 |

OTHER PUBLICATIONS

Andrew S. Tanenbaum, *Structured Computer Organization*, Prentice Hall, 1984, pp. 10–12, 162–177, 181–213, and 232–246.
Hill et al., *Digital Systems: Hardware Organization and Design*, Wiley & Sons, 1978, pp. 273–321.

*Primary Examiner*—William M. Treat
*Attorney, Agent, or Firm*—Steven P. Skabrat; Charles A. Johnson; Mark T. Starr

[57] ABSTRACT

A method and system for executing shift, mask, and merge operations on two operands specified by one instruction contains two registers holding operand data and separate shift, mask, and merge logic. A programmer-defined set of mask and merge indicators controls the mask and merge operations. Each mask and merge indicator is represented as a single bit but controls a pair of bits in an operand. If the first operand is selected by the programmer, it is shifted and then masked. The result of the shift and mask operations is merged with the second operand. If the second operand is selected, it is shifted and masked, and the result is merged with the first operand. Final results are stored for processing by subsequent instructions.

4 Claims, 8 Drawing Sheets

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 1 | 0 | 1 | 0 | 1 | 0 | 1 | 1 | 0 | 1 | 0 | 1 | 0 | 1 | 0 | 1 | 1 | 1 | 1 | 1 | 1 | 1 | 1 | 1 | 1 | 1 | 1 |

FIG. 7

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| 0 | 1 | 1 | 1 | 0 | 1 | 1 | 0 | 1 | 1 | 1 | 0 | 1 | 0 | 1 | 1 | 0 | 1 | 1 | 0 | 1 | 1 | 0 | 1 | 0 | 1 | 1 | 1 | 0 | 1 | 1 | 1 | 0 | 1 | 1 | 1 |

FIG. 8

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| 0 | 1 | 1 | 1 | 0 | 0 | 0 | 1 | 0 | 1 | 0 | 0 | 0 | 1 | 0 | 1 | 0 | 1 | 0 | 1 | 0 | 0 | 1 | 1 | 0 | 1 | 0 | 1 | 0 | 1 | 0 | 1 | 0 | 1 | 0 | 1 |

FIG. 9

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 1 |

FIG. 10

| 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| 1 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 0 | 0 | 0 | 0 | 0 | 0 | 0 | 0 | 0 | 0 | 0 | 0 | 0 |

FIG. 11

| 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| 1 | 1 | 1 | 1 | 0 | 1 | 1 | 0 | 1 | 1 | 0 | 1 | 1 | 0 | 1 | 0 | 1 | 0 | 1 | 0 | 1 | 1 | 1 | 1 | 0 | 1 | 1 | 0 | 0 | 0 | 0 | 0 | 0 | 0 | 0 | 0 |

SYSTEM FOR PROCESSING SHIFT, MASK, AND MERGE OPERATIONS IN ONE INSTRUCTION

CROSS REFERENCES TO RELATED APPLICATIONS

This application is related to the concurrently filed applications listed below, the disclosures of which are incorporated herein by reference. All of the listed applications are assigned to the same assignee as the present invention.

Microsequencer Bus Controller System, Ser. No. 08/172,657, invented by Larry L. Byers, Joseba M. De Subijana, and Wayne A. Michaelson.

BACKGROUND OF THE INVENTION

1. Field of the Invention

This invention relates generally to the processing of instructions for a digital computer system. More specifically, it relates to performing shift, mask, and merge operations on operands in a single instruction.

2. Background Information

Shifting is the process of moving data that is stored in a storage device relative to the boundaries of the device, as opposed to moving data in or out of the device. The storage device is usually a register and the direction of the shift is either left or right. In a circular shift, the bit shifted out of one end of the register is shifted into the other end. Thus, there is no loss of information for a circular shift. Shift operations are usually used in field alignments, packing and unpacking of data items into storage units, and high-speed multiplication and division.

Masking is used when items of information required by a computer program may be of lengths that are not matched to the usually fixed length of the storage unit in memory. If several items are packed into one unit, a mechanism is necessary to retrieve the item needed without interference from other items that are stored in the same storage unit. Masking is the procedure whereby the desired information is extracted from the storage unit while suppressing the undesired information.

Merging involves combining two distinct sets of data in a particular fashion into one set of data. It constructs the union of the two sets if all members of the sets are to be combined. The intersection of the two sets may also be formed if selected members of the two sets are to be discarded when constructing the resultant set.

Logic to perform shift, mask, and merge operations on data have been well known in the computer industry for many years. The instruction set architecture of a general purpose digital computer system typically includes various instructions to perform such logical operations. Each logical operation is usually implemented in one instruction. Thus, a computer programmer wanting to use a combination of these logical operations to manipulate a given set of data must code a series of instructions to obtain the desired result. This method provides the programmer with control over the order of execution and selection of operands for the logical operations. However, the drawback is that multiple instructions are required. Each instruction fetched and decoded by the processor takes processing time and uses space in the instruction control store. Using multiple instructions to perform a sequence of logical operations thus incurs a performance penalty. What is needed is a mechanism by which a computer programmer can control the manipulation of data in two operands according to common logical operations without the need to fetch and decode an instruction for each logical operation. Furthermore, a desirable capability is to be able to select one of the operands for shifting and masking, before merging it with the second operand.

Various patents in the prior art and describe instructions and show circuits which perform these individual logical operations, but none provide the speed and flexibility of the present invention. U.S. Pat. No. 3,906,459, to Desmonds, et. al., shows a binary data manipulator with shift, mask, and merge components. However, the operations supported are mutually exclusive per instruction cycle and are designed to be performed in a pipeline fashion. U.S. Pat. No. 3,982,229, to Rouse, et. al., shows a combinational logic arrangement for performing shift, rotate, and mask operations in parallel, followed by a merge operation. But, the output of the shift cannot be cascaded as input into the mask operation, as in the present invention. U.S. Pat. No. 4,139,899, to Tulpule, et. al., and U.S. Pat. No. 4,556,978, to Kregness, et. al., show systems for shifting and masking, but with no control over a merging operation. U.S. Pat. No. 4,569,016, to Hao, et. al., discloses a RISC-based system for shifting, masking, and merging operands. The present invention provides greater flexibility in specifying operands and operations for shifting, masking, and merging data in a single cycle.

SUMMARY OF THE INVENTION

An object of the present invention is to give a computer programmer increased flexibility for bit-level control of shift, mask, and merge operations on multiple operands.

Another object of this invention is to apply shift and mask operations to one selected operand, the result of which is merged with a second operand.

Another object of this invention is to process shift, mask, and merge operations on two operands in a single instruction, thereby saving execution time and instruction storage space.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a system and method for executing shift, mask, and merge operations on two operands specified by a single instruction. The Arithmetic Logic Unit Internal (ALUI) instruction provides a computer programmer great flexibility in manipulating data in two operands. The programmer can control the shifting, masking, and merging of the data in one instruction, instead of the three or more instructions usually required. The use of one instruction to perform these logical operations saves instruction fetch and decode time, and also saves instruction storage space.

In accordance with an aspect of the invention, a system for executing shift, mask, and merge operations on operands specified by one digital computer instruction comprises first and second operands, each holding data to be manipulated. Selection logic is included to select which one of the operands is to provide input data for the shift and mask operations. The non-selected operand provides pan of the input data for the merge operation. The other part of the input data for the merge operation is the result of the shift and mask operations. Separate logic for shifting, masking, and merging data is included, along with a register to hold mask and merge indicators. The mask and merge indicators control how the mask and merge logic manipulate the data. The result is stored in a register for use by subsequent processing.

In accordance with another aspect of the invention, a method for processing shift, mask, and merge operations on operands specified by one digital computer instruction, containing a shift count and a shift direction, comprises selecting which one of a first or second operand is to be shifted and masked. The contents of the selected operand are shifted the number of bits specified by the shift count either left or right, depending on the value of the shift direction. The result is then masked according to a set of programmer-defined mask indicators. The result of the mask operation is merged, according to a set of programmer-defined merge indicators, with the non-selected operand. The result of these processing steps may then be used for subsequent processing.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3 shows the format of the Mask and Merge operand.

FIG. 6 shows an example of a Mask and Merge operand.

FIG. 7 shows an example of the Bus Received Register.

FIG. 8 shows an example of Register A.

FIG. 9 shows Register A after the shift operation is performed.

FIG. 10 shows Register A after the Mask operation is performed.

FIG. 11 shows the Accumulator after the Merge operation is performed.

DESCRIPTION OF THE PREFERRED EMBODIMENT

Figure 1:
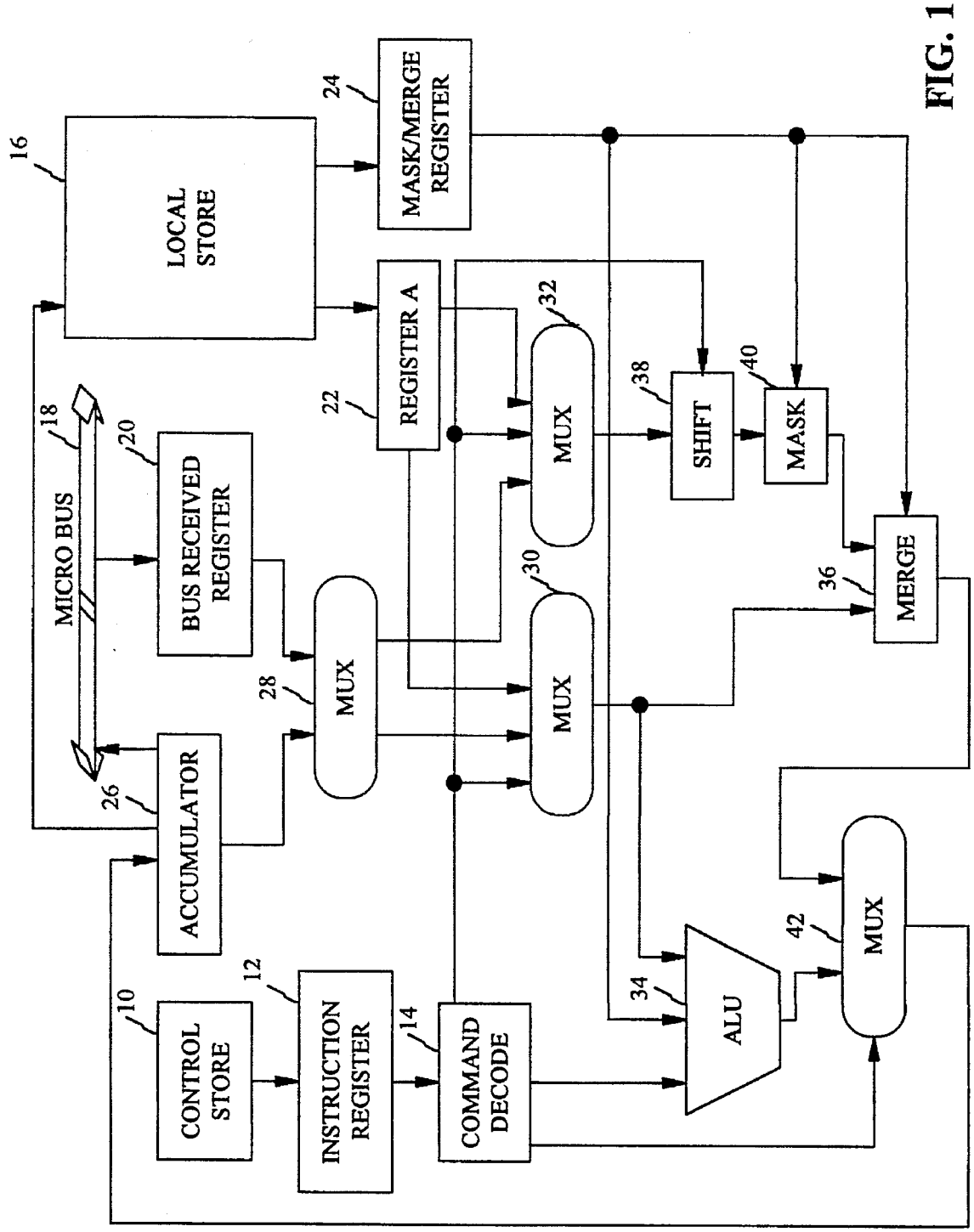
FIG. 1 is a block diagram illustrating relevant portions of the architecture of the processor in which this invention is embodied.

FIG. 1 is a block diagram illustrating relevant portions of the architecture of the processor in which this invention is embodied.

The Control Store 10 is used to store the instructions that are executed by the processor. These instructions are 44 bits wide. The Control Store 10, although in reality a Random Access Memory (RAM), is used as a read-only memory (ROM). The Control Store consists of seven Static RAM (SRAM) chips. Each SRAM holds 32 * 1024 (K) 8-bit bytes of data. Each unit of data stored in a Control Store consists of 44 bits of instruction, 8 bits of parity for the instruction, and 2 bits of address bit parity (one bit for even address drivers, one bit for odd address drivers). Since there are seven SRAMs, each holding 8 bits per byte, a total of 56 bits is available for storage of each storage unit if part of each storage unit is stored in each of the seven SRAMs.

The Control Store 10 is loaded with instructions at system initialization time by a Maintenance computer system (not shown). The parity bits and address bits are computed by the Maintenance computer system and appended to each instruction as it is stored. Later, as the processor is executing instructions, each instruction is fetched from the Control Store and parity values are computed from it. The processor compares the parity values computed by it against the parity checks stored in the Control Store 10. If there are any discrepancies, the Control Store is assumed to be corrupted and an internal check condition is raised in the processor. This is a fatal error and processing is halted.

Instructions are fetched from the Control Store 10 and loaded into the Instruction Register 12. Command Decode logic 14 determines which operation is to be performed by the processor based on the contents of the Instruction Register 12. Command Decode logic interprets the command code, identifies operands, and causes operand data to be fetched from the Local Store 16, internal registers, or from external devices via a bi-directional I/O bus called the Micro Bus 18. The Local Store 16 stores data internal to the processor for use in executing instructions. The Local Store 16 is implemented as a RAM cell containing 1024 36-bit words. It holds data such as a Jump History Stack, Call/Return Stack, Pre-defined Constants, General Purpose Variables, and Special Purpose Variables.

Operands used in instruction processing may be selected from several different registers. If operand data is to be received from a device external to the processor, the Micro Bus 18 handles the transfer of data. Operand data received over the Micro Bus is stored in the Bus Received Register (BUSR) 20. The Bus Received Register 20 contains 36 bits. Register A (REG A) 22 is used to hold general purpose operand data fetched from the Local Store 16. It also contains 36 bits. The Mask/Merge Register 24 holds mask and merge bits which control the operation of the Mask/Merge logic. The Accumulator 26 is a 36-bit register that holds the results of arithmetic logic unit (ALU) and Shift/Mask/Merge operations. Results from one instruction may be used as input to the next instruction.

Operands for the current instruction are selected via Multiplexer (MUX) 28, MUX 30, and MUX 32, according to the operands specified in the instruction as decoded by the Command Decode logic 14. The operands are fed to the ALU 32 or the Shift/Mask/Merge logic combination depending on the operation to be performed. The ALU 34 performs arithmetic and logic operations that are well known in the art. The Merge logic 36 performs a merging of the operand data as described in further detail below. The Shift logic 38 performs left or right shifting of operand data as specified by the instruction. The results of the Shift operation are passed to Mask logic 40, where the operand data is masked as described in further detail below. Results of the Shift/Mask/Merge logic combination are multiplexed with the results of ALU operation by MUX 42, and then forwarded to the Accumulator 26 for subsequent transmission over the Micro Bus 18, storage in the Local Store 16, or for use in subsequent instruction processing.

One of the instructions contained in the instruction set of this processor is the Arithmetic Logic and Shift Internal (ALUI) instruction. The Arithmetic Logic and Shift instruction is used to execute all arithmetic, logical, and shift/mask/merge operations that store results in the Local Store 16.

Figure 2:
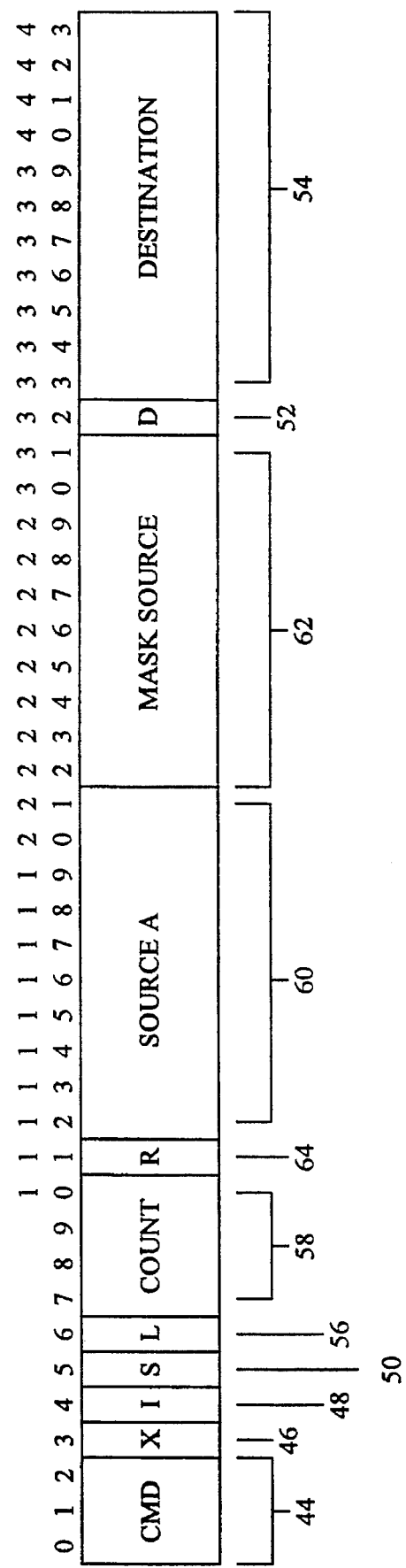
FIG. 2 is a diagram of the Arithmetic Logic and-Shift Internal (ALUI) instruction format.

FIG. 2 is a diagram of the Arithmetic Logic and Shift Internal (ALUI) instruction format. The CMD field (bits 0–2) 44, when equal to five, specifies to the Command Decode logic 14 that this is an ALUI instruction. The X field (bit 3) 46, when set, indicates that an indexed addressing mode for determining operand addresses is selected. The I field (bit 4) 48, when set, causes an internal register used as a loop counter (not shown on FIG. 1) to be incremented by one after all data references for this instruction are complete. The S field (bit 5) 50, when set, indicates that the operation to be performed is a shift. When the S field is clear, an arithmetic or logical operation is to be performed. The D field (bit 32) 52, when set, indicates that the upper six bits of the Local Store 16 address for the Destination field (bits 33–43) 54 are to be obtained from an internal register used to store a Local Store base address (not shown on FIG. 1). Thus, based addressing is supported.

When a shift operation is requested (S=1), the L field (bit 6) 56 indicates whether the shift is a left shift (when L=1) or a right shift (when L=0). The Count field (bits 7–10) 58 specifies the number of bits to be shifted. The Source A field (bits 12–21) 60 indicates the address in the Local Store 16 where the first operand for this operation is to be fetched. The first operand is loaded into Register A 22 as pan of the processing of this instruction. The second operand was loaded into the Bus Received Register 20 from the Micro Bus 18 during the execution of the previous instruction. The Mask Source field (bits 22–31) 62 indicates the address in the Local Store 16 where the Mask and Merge operand is to be fetched. The Mask and Merge operand is stored in Mask/Merge Register 24.

Figure 3:
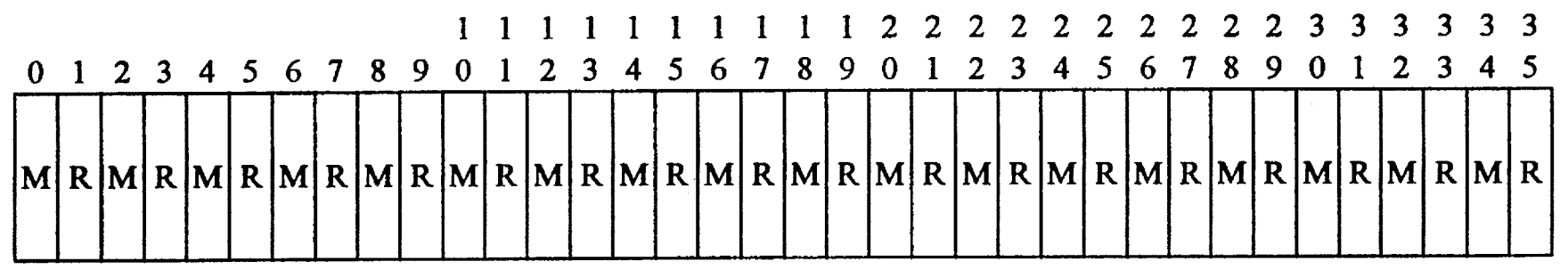

FIG. 3 shows the format of the Mask and Merge operand. The even numbered bits (denoted by 'M') represent the Mask values and the odd bits (denoted by 'R') represent the Merge values. These bits control the masking and merging of the data. The Mask/Merge bits operate on bit pairs of an operand. Thus, a Mask/Merge bit pair (bits 0–1, 2–3, 4–5, etc.) control corresponding bit pairs of the operand. If a Mask bit is set, then the corresponding bit pair of the operand is carried forward to the result register. If a Mask bit is clear, then the corresponding bit pair of the operand is not carried forward to the result register; instead, the specified bit pair in the result register is cleared. If a Merge bit is set, the corresponding bit pair of the second operand, which is stored in Bus Received Register 20, is copied to the result register. If a Merge bit is clear, the corresponding bit pair of the first operand, which is stored in Register A 22, is copied to the result register.

Mask and merge indicator bits control bit pairs in the preferred embodiment of this invention rather than individual bits of the operands. If an indicator bit was to be used for each bit in the operand to be masked or merged, a 36-bit register would be needed for each of the Mask and Merge indicator sets. Thus, an additional register would need to be allocated in this architecture to support masking and merging in a single instruction. More importantly, if two registers were used to hold Mask and Merge indicator bits, two reads from the Local Store 16 would have to be performed in order to load these registers. Minimizing this overhead was considered more important than providing the programmer with a single bit control capability. Therefore, each Mask and Merge indicator controls a bit pair.

Referring back to FIG. 2, when the R field (bit 11) 64 is set, a shift and mask are executed on the Bus Received Register 20 operand through MUX 32, and then a merge of the contents of the Bus Received Register 20 and Register A 22 from MUX 30 is executed, according to the control bits specified in the Mask and Merge operand stored in the Mask/Merge Register 24. When the R field 64 is clear, a shift and mask are executed on the contents of Register A 22, and then a merge of Register A 22 and the Bus Received Register 20 is executed, according to the control bits specified in the Mask and Merge operand stored in the Mask/Merge Register 24. After these operations are performed, the result is in Accumulator 26. The result is then stored at the address in the Local Store 16 memory location designated by the Destination field (bits 33–43) 54.

Figure 4:
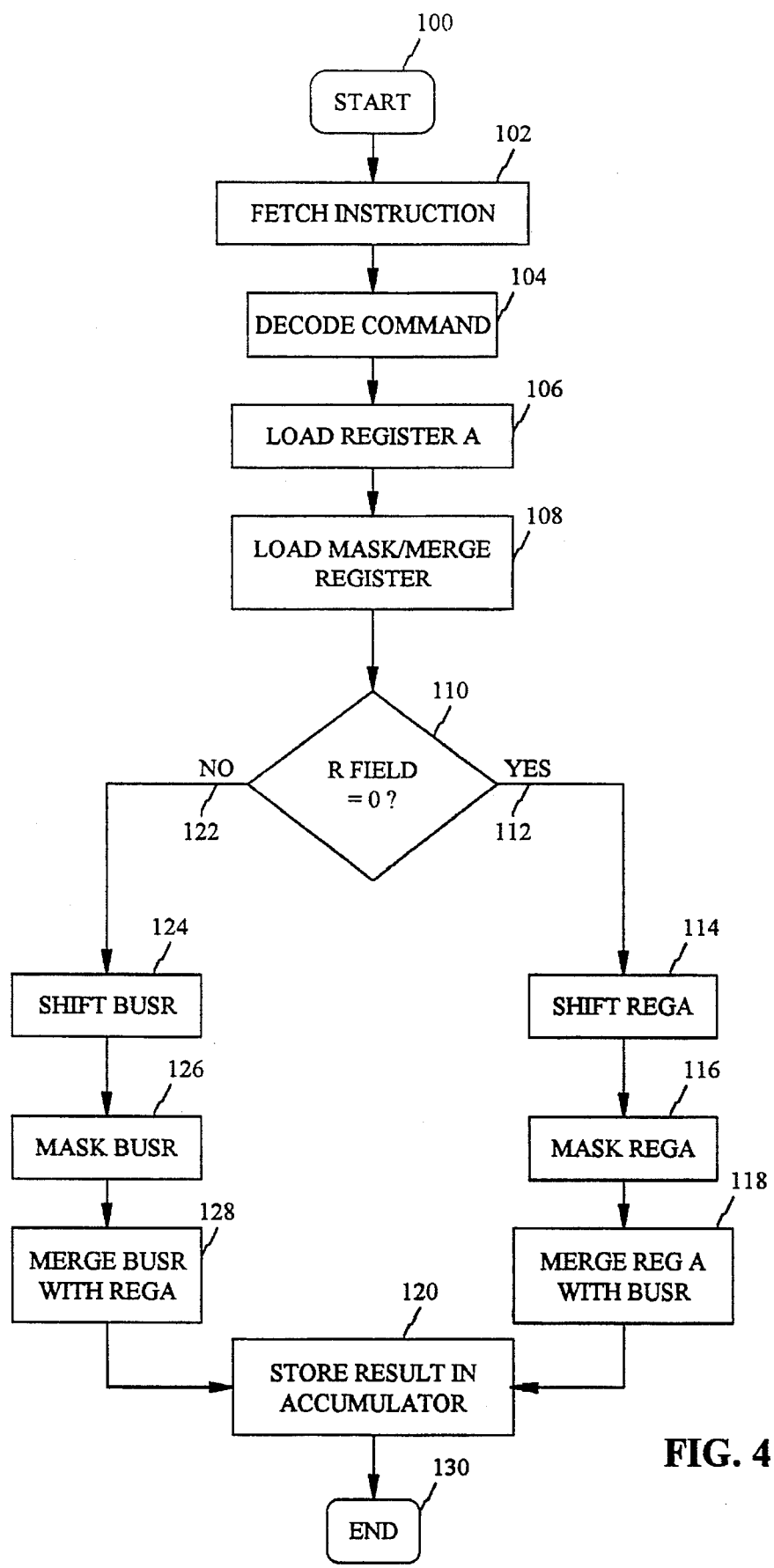
FIG. 4 is a flow chart showing the steps for processing an ALUI instruction containing shift, mask, and merge operations.

FIG. 4 is a flow chart showing the steps for processing an ALUI instruction containing shift, mask, and merge operations. Processing begins at the Start step 100. First, the instruction is fetched from the Control Store 10 (Step 102). The command is then decoded at Step 104. Register A 22 is loaded with data from the Local Store 16 at Step 106. The Mask/Merge Register 24 is loaded with the mask and merge flags at Step 108. If the R field 64 is clear at Step 110, then the Yes path 112 is taken and a shift operation is performed on Register A 22 at Step 114. Next, the contents of Register A are masked (Step 116) and then merged with the contents of the Bus Received Register 20 (Step 118). The result is stored in the Accumulator 26 at Step 120. If the R field 64 is set at Step 110, then the No path 122 is taken and a shift operation is performed on the Bus Received Register 20 at Step 124. Next, the contents of the Bus Received Register are masked (Step 126) and then merged with the contents of Register A 22 (Step 128). The result of this combination of operations is also stored in the Accumulator at Step 120. Processing ends at Step 130.

Figure 5:
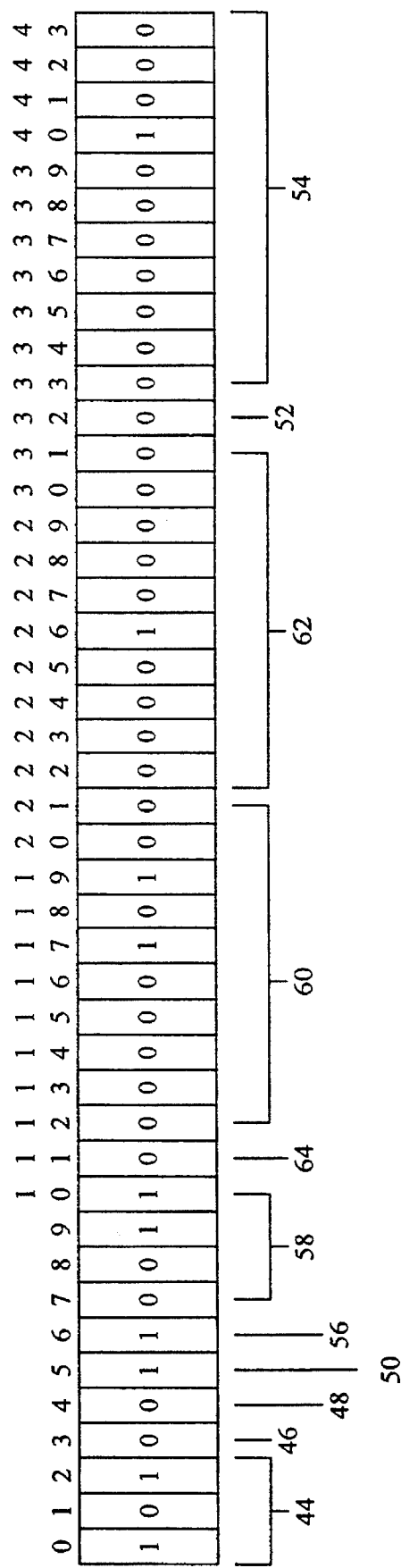
FIG. 5 is an example of an ALUI instruction.

The following example illustrates how the contents of the Mask/Merge Register 24, Bus Received Register 20, Register A 22, and Accumulator 26, are used by the Shift/Mask/Merge logic combination. FIG. 5 is an example of an ALUI instruction. This instruction is loaded into the Instruction Register 12. The CMD field 44 is five, thereby indicating to the Command Decode logic 14 that this is an ALUI instruction. The X field 46 is clear, so the indexed addressing mode is not selected. The I field 48 is clear, so automatic indexing of a loop counter register is not necessary. The S field 50 is set, indicating that a shift operation is requested. The L field 56 is set so a left shift is to be performed. The Count field 58 specifies that the operand should be shifted three bits to the left. The Source A field 60 specifies 22 (octal) as the address in the Local Store 16 where the operand for Register A 22 is to be read from. The Mask Source field 62 specifies 40 (octal) as the address in the Local Store 16 where the Mask and Merge operand for the Mask/Merge Register 24 is to be read from. The D field 52 is clear, so based addressing is not required. Finally, the Destination field 54 specifies 10 (octal) as the address in the Local Store 16 where the result of the Shift/Mask/Merge operation is to be stored.

Processing of the instruction proceeds as follows. The Mask/Merge Register 24 is loaded with the contents of the address in the Local Store referenced by the Mask Source field 62. FIG. 6 shows an example of a Mask and Merge operand. Bits 0–7 are clear, indicating that both the Mask and Merge flags are not selected for bits 0–7 of the operand. Bits 8–15 are set to "01", indicating that the Mask flags are set, but the Merge flags are not, for bits 8–15 of the operand. Bits 16–23 are set to "10", indicating that the Mask flags are not set, but the Merge flags are, for bits 16–23 of the operand. Bits 24–35 are set, indicating that both the Mask and Merge flags are selected for bits 24–35 of the operand.

The Bus Received Register 20 was loaded as an operand when data was received over the Micro Bus 18. FIG. 7 shows an example of the Bus Received Register. The bit pattern shown in FIG. 7 is not meant to have any special significance. It is merely meant to be an example of a 36-bit value. The pattern may make the operation of this instruction easier to depict in this example.

Register A 22 is loaded with the contents of the address in the Local Store 16 referenced by the Source A field 60 of the ALUI instruction. FIG. 8 shows an example of Register A. Referring back to FIG. 5, the R field 64 is clear, thereby directing that a shift and mask are to be executed on the contents of Register A 22, and then a merge of Register A 22 and the Bus Received Register 20 is to be performed. The first step in implementing this instruction according to the present example is to circular left shift Register A by three bits. FIG. 9 shows Register A after the shift operation is performed.

The second step according to the present example is to mask the contents of Register A 22. Referring back to FIG. 6, one can see that the Mask flags are clear for bits 0, 2, 4, 6, 8, 10, 12 and 14, and set for bits 16, 18, 20, 22, 24, 26, 28, 30, 32, and 34. Thus, bits 0–15 of Register A 22 are masked (cleared) and not carried forward. But bits 16–35 of Register A 22 are carried forward. FIG. 10 shows Register A after the Mask operation is performed.

The third step according to the present example is to merge the contents of Register A 22 and the Bus Received Register 20, with the results ending up in the Accumulator 26. Referring back to FIG. 6, one can see that the Merge flags are clear for bits 1, 3, 5, 7, 17, 19, 21, and 23, and set for bits 9, 11, 13, 15, 25, 27, 29, 31, 33, and 35. Thus, bits 0–7 of the Accumulator 26 are written with bits 0–7 of Register A 22. Bits 8–15 of the Accumulator 26 are written with bits 8–15 of the Bus Received Register 20. Bits 16–23 of the Accumulator 26 are written with bits 16–23 of Register A 22. Finally, bits 24–35 of the Accumulator 26 are written with bits 24–35 of the Bus Received Register 20. FIG. 11 shows the Accumulator after the Merge operation is performed. Of course, other combinations of shift/mask and merge operations are possible, given the definition of the ALUI instruction and the logic that implements it.

A system and method for performing shift, mask, and merge operations in one instruction has been defined. This invention gives a computer programmer great flexibility in manipulating multiple operands by various logical operations in a single instruction. Because only one instruction is fetched and decoded rather than several instructions, time and storage space are saved over previous methods.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A system for selectively executing shift, mask, and merge operations on two operands specified by one computer instruction according to a programmably selectable shift count, a programmably selectable shift direction, and programmably selectable mask and merge conditions, comprising:

a first register to hold at least temporarily a first operand to be manipulated;

a second register to hold at least temporarily a second operand to be manipulated;

selection circuitry, coupled to said first and said second registers, for alternatively selecting true of said first and said second registers for shifting and masking, and then merging with the other register, based on the contents of the computer instruction;

shift circuitry, connected to said selection circuitry and said first and said second registers, for selectively shifting said selected one of said first and said second registers according to the programmably selectable shift count and shift direction;

a mask/merge register holding mask and merge indicators representing the programmably selectable mask and merge conditions, said mask indicators indicating a plurality of single-bit flags controlling masking of multiple-bit portions of a mask operand, said merge indicators including a plurality of single-bit flags controlling merging of multiple-bit portions of merge operands;

mark circuitry, connected to said shift circuitry and said mask/merge register, for selecting a portion of said shifted selected one of said first and said second registers to be merged, by masking said shifted selected one of said first and said second registers according to said mask indicators; and merge circuitry, connected to said mask circuitry and said mask/merge register, for merging said selected portion of said shifted selected one of said first and said second registers with the other register, according to said merge indicators, to produce a merged result.

2. The system of claim 1, further including an internal communication bus connected to said second register, said internal communication bus providing input data for said second register.

3. In a data processing system having stored instructions, a local store memory, instruction selection, decoding, and execution circuitry, and addressable storage for storing instructions and operands, a method for processing programmably selectable shift, mask, and merge operations on selected operands specified by one computer instruction, the instruction containing a shift count and a shift direction, said method comprising the steps of:

a) fetching the instruction from the addressable storage for processing;

b) decoding a shift/mask/merge command embedded in the fetched instruction;

c) loading a first operand with data obtained from a first local store memory location specified by the fetched instruction;

d) loading a mask/merge register with programmably selectable mask and merge indicators obtained from a second local store memory location specified by the fetched instruction, said programmably selectable mask indicators including a plurality of one-bit flags controlling masking of two-bit portions of a mask operand, said programmably selectable merge indicators including a plurality of one-bit flags controlling merging of two-bit portions of merge operands;

e) selecting one of said first operand or a second operand to be shifted and masked;

f) shifting said selected operand according to the shift count and the shift direction;

g) masking the shifted portion of said selected operand according to said programmably selectable mask indicators; and h) merging the shifted and masked portion of said selected operand, according to said programmably selectable merge indicators, with the unselected operand to produce a merge result.

4. A system for selectively executing shift, mask, and merge operations on two operands specified by one computer instruction according to a programmably selectable shift count, a programmably selectable shift direction, and programmably selectable mask and merge conditions, comprising:

a random access local store memory to hold operands for the shift, mask, and merge operations and to hold mask and merge indicators representing the programmably selectable mask and merge conditions, said mask indicators including a plurality of one-bit flags controlling masking of two-bit portions of a mask operand, said merge indicators including a plurality of one-bit flags controlling merging of two-bit portions of merge operands;

a first register connected to said random access local store memory to hold at least temporarily a first operand to be manipulated, said first operand being selected from said random access local store memory by the computer instruction;

a second register to hold at least temporarily a second operand to be manipulated;

an internal communications bus connected to said second register, said internal communications bus providing input data signals to said second register;

selection circuitry, coupled to said first and said second registers, to alternatively select one of said first and said second registers to be shifted and masked, and then merged with the other register, according to the computer instruction;

shift circuitry, connected to said selection circuitry, to selectively shift said selected one of said first and said second registers according to the programmably selectable shift count and shift direction;

a mask/merge register connected to said random access local store memory to hold said mask and merge indicators;

mask circuitry, connected to said shift circuitry and said mask/merge register, to select a portion of said shifted selected one of said first and said second registers to be merged, by masking said shifted selected one of said first and said second registers according to said mask indicators; and merge circuitry, connected to said selection circuitry, said mask circuitry and said mask/merge register, to merge said selected portion of said shifted selected one of said first and said second registers with the other register, according to said merge indicators, to produce a merged result.

* * * * *

UNITED STATES PATENT AND TRADEMARK OFFICE
CERTIFICATE OF CORRECTION

PATENT NO. : 5,487,159
DATED : January 23, 1996
INVENTOR(S) : Byers, et. al.

It is certified that error appears in the above-indentified patent and that said Letters Patent is hereby corrected as shown below:

Column 8, line 4, Claim 1, delete "true" and substitute -- one--.

Signed and Sealed this

Seventh Day of May, 1996

Attest:

BRUCE LEHMAN

*Attesting Officer*     *Commissioner of Patents and Trademarks*